United States Patent
Lei

(10) Patent No.: US 7,416,619 B2
(45) Date of Patent: Aug. 26, 2008

(54) APPLICATION OF AN ALLOY IN KITCHEN UTENSIL PRODUCTS

(75) Inventor: Iou Lei, Macau (CN)

(73) Assignee: Xinhui Rixing Stainless Steel Product Company Limited, Guangdong (CN)

(*) Notice: Subject to any disclaimer, the term of this patent is extended or adjusted under 35 U.S.C. 154(b) by 172 days.

(21) Appl. No.: 10/516,787

(22) PCT Filed: Jun. 3, 2002

(86) PCT No.: PCT/CN02/00384

§ 371 (c)(1),
(2), (4) Date: Jun. 24, 2005

(87) PCT Pub. No.: WO03/102258

PCT Pub. Date: Dec. 11, 2003

(65) Prior Publication Data

US 2006/0130668 A1  Jun. 22, 2006

(51) Int. Cl.
*C21D 8/00* (2006.01)
*B65D 88/40* (2006.01)

(52) U.S. Cl. .......... 148/542; 148/546; 148/609; 148/610; 220/573.1; 220/917; 220/912; 29/521; 72/379.4

(58) Field of Classification Search .......... 148/325, 148/542, 546, 609, 610; 220/573.1, 573.3, 220/573.4, 917, 912; 29/521, 527.4; 72/379.4
See application file for complete search history.

(56) References Cited

U.S. PATENT DOCUMENTS 3,183,080 A * 5/1965 Harpster ............... 420/61
3,201,231 A * 8/1965 Harpster ............... 420/67
6,702,140 B1 * 3/2004 Sollo ................. 220/573.3

FOREIGN PATENT DOCUMENTS

| CN | 1246545 A |   | 3/2000 |
| JP | 52-127424 | * | 10/1977 |
| JP | 8-209308 | * | 8/1996 |
| JP | 8-325691 A |   | 12/1996 |
| JP | 10-121205 | * | 5/1998 |
| JP | 10-121205 A |   | 5/1998 |
| JP | 10-130786 | * | 5/1998 |
| JP | 11-302739 | * | 11/1999 |

OTHER PUBLICATIONS

Computer-generated English translation of Japanese patent 11-302739, Abe et al., Nov. 2, 1999.*
Computer-generated English translation of Japanese patent 10-121205, May 12, 1998.*
Derwent-Acc-No. 2000-033819, Abe et al, English abstract of Japanese patent 11302739 dated Nov. 2, 1999.*

* cited by examiner

*Primary Examiner*—Deborah Yee
(74) *Attorney, Agent, or Firm*—Morris Manning Martin LLP; Tim Tingkang Xia, Esq.

(57) ABSTRACT

The present invention relates to new kitchen utensils, in particular relates to an application of a material in kitchen utensils. The present invention solves the problems of long-term presence in the field. SUS436L is used for kitchen utensils. SUS436L chemical composition (wt %) comprises Cr 16-19, $C \leq 0.025$, $Si \leq 1.00$, $Mn \leq 1.00$, $N \leq 0.02$, $Ni \leq 0.60$, $Ti \leq 0.75$, Mo 0.75-1.50 and balance of Fe. The kitchen utensils have all excellence of present kitchen utensils, overcome its disadvantage and possess high property of heat conduction and magnetoconductivity. The kitchen utensils are used in induction cooker, possess the all and the one structure and have low cost.

5 Claims, 2 Drawing Sheets

APPLICATION OF AN ALLOY IN KITCHEN UTENSIL PRODUCTS

TECHNICAL FIELD

The present invention relates to the application of a certain material in kitchen utensils, and more specifically, to the application of the material SUS436L in culinary vessels such as containers, cookware, dishware etc. Particularly, the present invention relates to the application in the manufacture of induction cookers and other kitchenware which requires high heat conductivity and magnetoconductivity.

BACKGROUND ART

Kitchen utensils, for example, cookware such as boilers and the like, have been developed rapidly, which were early made of iron, aluminum or ceramic and gradually superseded by stainless steel that mainly consists of Cr18Ni9. It is well known that early iron kitchenware is magnetic and prone to rust. Later-developed aluminum one is easy to manufacture and nonmagnetic, however, it should be under surface chemical treatment and oil injection during the manufacture process to obtain certain hardness and prevent it from oxidation, meanwhile, the inner surface of this kitchenware should be sprayed with a nonstick coating so that it can be used safely. Cr18Ni9 ( steel type No. 304, called material SUS304 for short bellow) is a kind of Austenitic Steel, whose chemical composition (WT %) comprises: Cr 17-19, Ni 8-11, C$\leqq$0.06, Si$\leqq$1.00, Mn$\leqq$2.00, S$\leqq$0.030, P$\leqq$0.035, and the balance of Fe. This material is nonmagnetic, corrosion proof and easy to manufacture. Furthermore, its products are antirust so that the surface is shiny and beautiful, and can be used in a gas furnace or an electric cooker. A compound base should be added to the bottom of the products when they are used in induction cookers.

Induction cooker, which makes use of the electromagnetic effect to heat is a stove developed rapidly recently. Since only magnetic materials could be applied in the induction cooker, generally speaking SUS304 itself does not conform to the manufacture of the products used for induction cooker. However, due to its excellent property in many aspects, this material can be made into cooking vessel used for induction cooker if the bottom of the vessel is necessarily covered with magnetic materials. At present, for example, the steel-aluminum-steel compound base is in common use, that is, first a layer of aluminum or copper is soldered on the bottom of the vessel made of the said material; and then a magnetic stainless steel layer is formed on. The material of steel-aluminum-steel, however, costs high and is hard to process. FIG. 1 shows the schematic view of the compound base, wherein material 304 can be used in part A; pure aluminum or copper can be used in part B; and in part C magnetic metal materials, such as steel 1Cr17 (called SUS430 for short, whose chemical composition comprises Cr 16-18, C$\leqq$0.12, Si$\leqq$0.80, Mn$\leqq$0.80, S$\leqq$0.030, P$\leqq$0.035, Ni$\leqq$0.60, trace amount of Mo and Ti, and the balance of Fe) and copper etc., can be used.

In order to solve the problem that SUS304 can not be directly used in the induction cooker, people have been looking for a multifunctional material to substitute for SUS304, which has the advantages of SUS304 and can be applied in manufacture of the products used in the induction cooker, but always failed. In addition, many materials, such as SUS430, perform badly in manufacture process. It certainly will increase the product cost and bring other problems, especially in the manufacture of deep-drawing vessels and containers. As a result, many researchers gave up with no suitable material being found.

SUS436L, which is a kind of Ferritic Steel, comprises in chemical composition (wt %) Cr 17-19, C$\leqq$0.025, Si$\leqq$1.00, Mn$\leqq$1.00, N$\leqq$0.02, Ni$\leqq$0.60, Ti$\leqq$0.75, Mo 0.75-1.50, and the balance of Fe. There is little nickel in this material, meanwhile, trace amount of molybdenum and titanium are added in. This material which is mainly used in automobile silencer and exhaust pipe has excellent anticorrosive property and high heat conductivity and magnetoconductivity.

SUMMARY OF THE INVENTION

One of the purposes of the present invention is to research and look for a material that is suitable for kitchen utensils production, particularly suitable for the cookware that requires high heat conductivity and magnetoconductivity. The said cookware can be used in gas furnace, electric cooker or induction cooker.

Another purpose of the present invention is to research and look for a material that is suitable for kitchen utensils production, particularly suitable for the cookware that requires high heat conductivity and magnetoconductivity and no compound base is needed, i.e. integrative cookware. As a result, the cost of the cookware can be reduced and all the disadvantages of conventional compound base can be eliminated.

Another purpose of the present invention is to research and look for a material that is suitable for kitchen utensils production and their compound bases. Therefore, the cookware can be added a compound base to form a second base with the same material as required. The cookware after this process is better than the one made of steel-aluminum-steel compound material in performance and eliminates the disadvantages of the conventional compound base materials, such as easy oxidation, poor heat conductivity.

A further purpose of the present invention is to research and look for a material that is suitable for kitchen utensils production and has the above mentioned advantages; moreover, the cost of material and processing are relatively low.

Another purpose of the present invention is to research and look for a material that is suitable for kitchen utensils production and has the above mentioned advantages; moreover, can be applied in production of other kinds of kitchen utensils.

The other purposes and advantages according to the present invention will be more apparent by reading the detailed description of the application.

The inventor has found, through research, selection, and repeated experiments, that the Ferritic Steel with the chemical composition(wt %) of Cr 16-19, C$\leqq$0.025, Si$\leqq$1.00, Mn$\leqq$1.00, N$\leqq$0.02, Ni$\leqq$0.60, Ti$\leqq$0.75, Mo 0.75-1.50 and the balance of Fe can be used in the kitchen utensils production and reach all the purposes and requirements of the present invention. Typically, this kind of material available in market includes SUS436L (Chinese National Standards). After repeated experiments, the inventor has solved the problems in processing the material SUS436L and therefore firstly succeeded in applying SUS436L in the field of kitchen utensils production. The SUS436L used in kitchen utensils production has all the advantages as material SUS304 used in the same, for example, due to the anticorrosive and magnetic property of this material, it can be applied in manufacture of integrative products used in induction cooker, gas furnace and electric cooker. In addition, due to the integrative structure, the cost of the cookware made of this material can be reduced. Moreover, as the material does not contain nickel, it is helpful to the environment protection and saving energy.

DETAILED DESCRIPTION OF THE INVENTION

In one aspect of the present invention, it provides kitchen utensil products formed by a new type of material. The said kitchen utensil products include cookware, dishware and culinary vessels according to the present invention.

The new type of material used in the present invention comprises in chemical composition as follows (wt %): Cr 16-19, C$\leqq$0.025, Si$\leqq$1.00, Mn$\leqq$1.00, N$\leqq$0.02, Ni$\leqq$0.60, Ti$\leqq$0.75, Mo 0.75-1.50 and the balance of Fe. Typically, this kind of material available in market includes SUS436L.

Comparison of the properties between SUS436L and other materials are listed in Table 1:

TABLE 1

|  | Heat Conductivity at 100° C. (W/m ° C.) | Magnetoconductivity | Pitting Potential (mV) |
| --- | --- | --- | --- |
| SUS436L | 23.6 | $10^4$ | 290 |
| SUS304 | 16.2 | 1.004 | 300 |
| SUS430 | 26.1 | $10^4$ | 100 |

It can be seen from the above data that SUS436L is good at heat conduction and magnetic conduction; and has excellent anticorrosive property.

Figure 4:
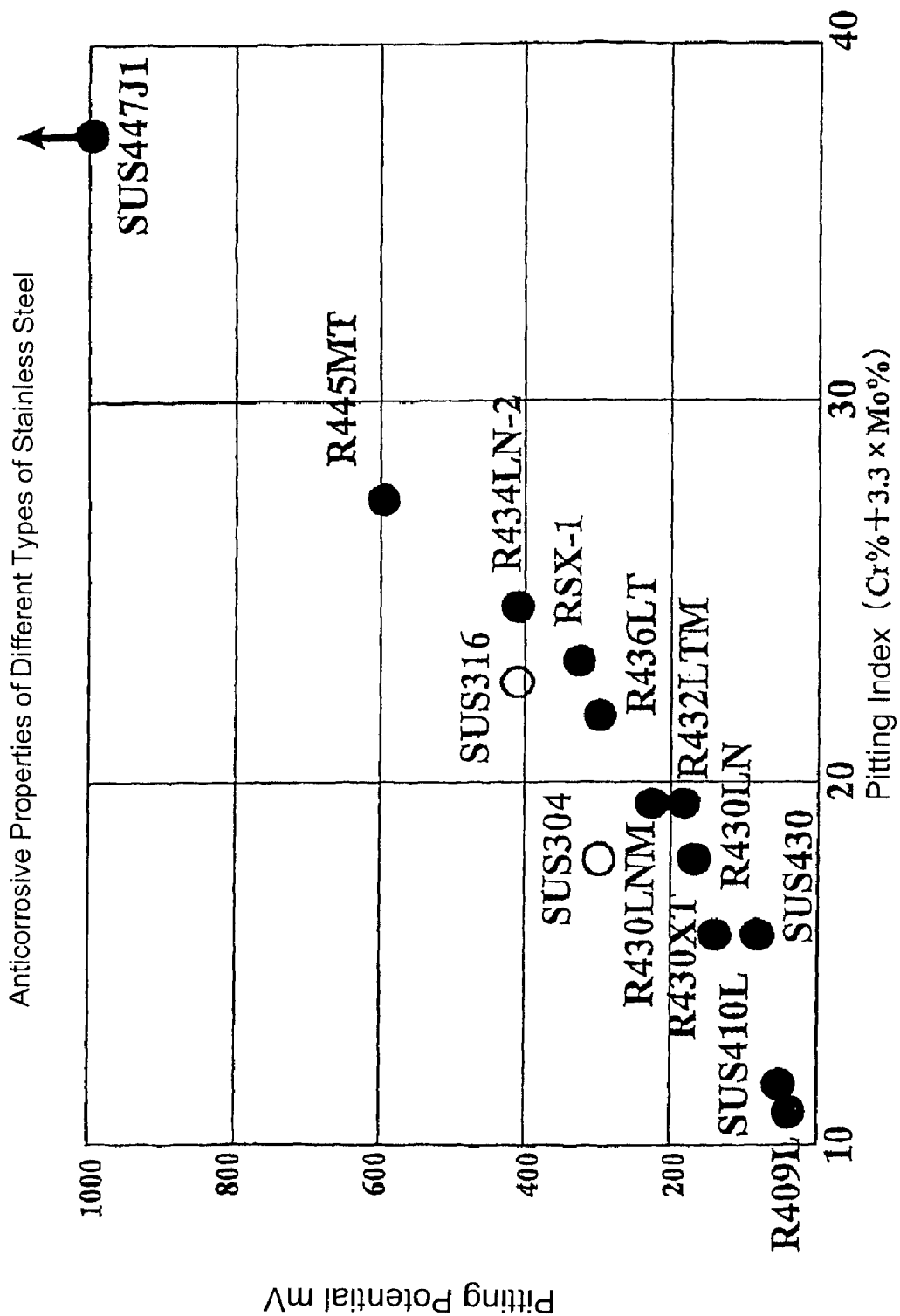
FIG. 4 illustrates the comparison of the anticorrosive properties between the material applied according to the present invention and other materials.

Comparison of the anticorrosive properties between SUS436L and other materials can be seen from the data shown in FIG. 4, from which the same result can be concluded as from Table 1.

The process of manufacturing the cookware (in cylindrical shape) according to the present invention includes: 1) Stamping the materials on the punch to form wafers at different diameters depending on the product specification desired; 2) Oil Rolling, more oil is used in this process to SUS436L than to material SUS304, due to the lower yield strength and elongation of SUS436L; moreover, since SUS436L are relatively soft and easy to be scratched, more attention to be paid in the process; 3) Elongation Process, it may be a single elongation or a double elongation, depending on the desired elongation extent, in which the first elongation coefficient can be 0.52~0.55 while the second elongation coefficient can be 0.78~0.8 to form desired dimensions; 4) to form all kinds of shapes according to the requirement; and 5) Surface Treatment.

According to another aspect of the present invention, it provides a culinary vessel which is integrative and made of SUS436L. The process includes: 1) Stamping the materials on the punch to form wafers at different diameters depending on the product specification desired; 2) Oil Rolling, more oil is used in this process to SUS436L than to material SUS304, due to the lower yield strength and elongation of SUS436L; moreover, since SUS436L are relatively soft and easy to be scratched, more attention to be paid in the process; 3) Elongation Process, it may be a single elongation or a double elongation, depending on the desired elongation extent, in which the first elongation coefficient can be 0.52~0.55 while the second elongation coefficient can be 0.78~0.8 to form desired dimensions; 4) to form all kinds of shapes according to the requirement; and 5) Surface Treatment.

It further provides a culinary vessel which has a compound base made of SUS436L according to another aspect of the present invention. The process to form the compound base includes coating fluxes and solders on the bottom of the vessel with a sifter after forming the vessel; and then soldering an aluminum or copper slice with the compound base on the bottom of the vessel by a brazing machine. The compound base may be made of the same material: SUS436L. During the process of forming the compound base, special attention should be paid to the control of the soldering temperature, in which the base to be compounded will be overheated, causing weld seam, if the temperature is too high. Meanwhile, a cooling ring should be added to the base to avoid the distortion of the vessel. It also can be made into the impact bonding cooker and the like, whose body and compound base are both made of SUS436L.

The materials according to the present invention generally are plates, which are changeable in thickness depending on the, for example, 0.4-2.5 mm. The height of the vessel 10-600 mm depending on the requirement, preferred 50-320 mm; the diameter of the vessel ranges from 100-600 mm, preferred from 100-360 mm. In addition, the products according to the present invention include boilers and dishes, particularly the cookware which requires high heat conductivity and magnetoconductivity.

According to the present invention, the cookware made of SUS436L can completely substitute for that made of aluminum or material 304 series. The disadvantages of aluminum products include: 1) they can not be used in the induction cooker; 2) their surface should be under chemical treatment so as to achieve certain hardness and to prevent oxidation; as a result, their longevity are shorter and the products are less of aesthetics compared with material 436; 3) a nonstick coating should be sprayed in the inner surface for being used safely. On the contrary, using the material 436 eliminates all the disadvantages mentioned above, and the property of high heat conductivity and magnetoconductivity plays an effective role in practice. Meanwhile, the inner surface can be coated with a nonstick coating or not depending on the need of the market.

Embodiments

EXAMPLE 1

Figure 1:
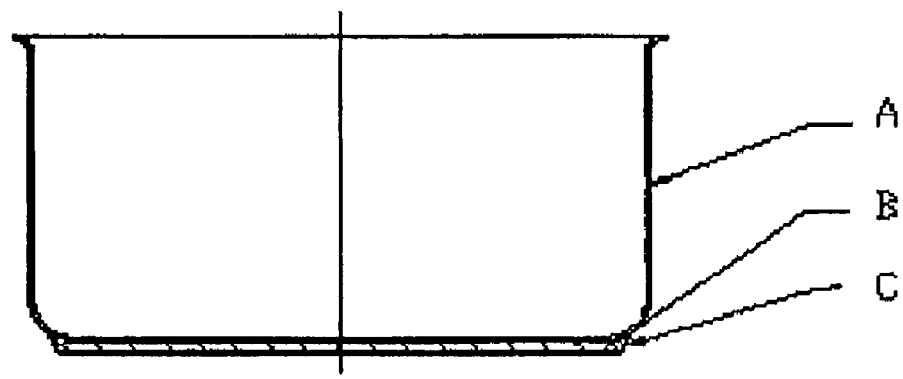
FIG. 1 shows the schematic view of the compound base.
Figure 2:
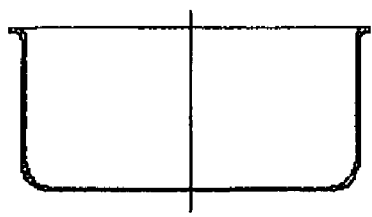
FIG. 2 shows the schematic view of one embodiment according to the present invention.

Manufacture of Integrative Cooker, as Shown in FIG. 2

Model of the boiler: straight body and cut edge cooker with a single base
Size: 200*100 mm
Thickness: 2.0 mm
Process in detail:
1) Stamping, press the material on the 100-ton-punch to form a wafer of Φ360 mm, i.e. a wafer having a diameter Φ=360 mm;
2) Oil Rolling;
3) Single Elongation, the blankholder force is 10 MPa; the angle R of the male die is R16, and the angle R of the female die is R10, i.e., the male die has a corner radius R=16 mm, and the female die has a corner radius R=11 mm;
4) Trimming and Surface Treatment. Then the finished cooker is achieved.

EXAMPLE 2

Figure 3:
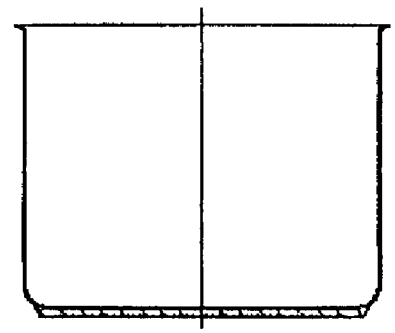
FIG. 3 shows the schematic view of another embodiment according to the present invention.

Cooker with a Compound Base, as Shown in FIG. 3

Model of the boiler: straight body and cut edge cooker with a compound base
Size: 240*200 mm
Thickness: 1.0 mm
Process in detail:
1) Stamping the material on the 100-ton-punch to form a wafer of Φ510 mm, i.e. a wafer having a diameter Φ=510 mm;
2) Oil Rolling;
3) First elongation, the blankholder force is 10 MPa; the angle R of the male die is R16, and the angle R of the female die is R11, i.e., the male die has a corner radius R=16 mm, and the female die has a corner radius R=11 mm;
4) Second Elongation, the blankholder force is 5 MPa; the angle R of the male die is R16, and the angle R of the female die is R5; i.e., the male die has a corner radius R=16 mm, and the female die has a corner radius R=5 mm;
5) Trimming and Surface Treatment.
6) Forming a compound base (either solderbrazing or impact bonding)
Then the finished cooker is achieved.

Although only two examples are given above, it is appreciated that the persons skilled in this field may also extend the technology to manufacture other kinds of cookware according to the disclosure of this description.

What is claimed is:

1. A process of manufacturing a kitchen utensil from an alloy, comprising the steps of:
   a. stamping the alloy on a punch to form a wafer having a diameter, Φ;
   b. oil rolling the alloy;
   c. forming the kitchen utensil using an elongation process on the alloy; and
   d. trimming and surface treating the formed kitchen utensil,
wherein the alloy has a composition (in wt %) consisting of: Cr 16-19, C≦0.025, Si≦1.00, Mn≦1.00, N≦0.02, Ni≦0.60, Ti≦0.75, Mo 0.75-1.50 and the balance of Fe, wherein the kitchen utensil includes a cookware, dishware and culinary vessel, wherein the cookware is integrative, wherein the kitchen utensil is a straight body and cut edge cooker with a single base, wherein the punch is an about 100-ton punch, wherein the diameter Φ of the wafer is about 360 mm, wherein in the elongation process, the blankholder force is about 10 MPa, the angle of the male die is R16 that characterizes the male die having a corner radius R=16 mm, and the angle of the female die is R10 that characterizes the female die having a corner radius R=10 mm.

2. The process according to claim 1, wherein the alloy is in accordance with SUS436L.

3. The process according to claim 1, wherein the elongation process has an elongation coefficient of in a range of about 0.52-0.55.

4. A process of manufacturing a kitchen utensil from an alloy, comprising the steps of:
   a. stamping the alloy on a punch to form a wafer of a diameter, Φ;
   b. oil rolling the alloy;
   c. forming the kitchen utensil using an elongation process on the alloy, wherein the elongation process comprises a first elongation process and a second elongation process; and
   d. trimming and surface treating the formed kitchen utensil,
wherein the alloy has a composition (in wt %) consisting of: Cr 16-19, C≦0.025, Si≦1.00, Mn≦1.00, N≦0.02, Ni≦0.60, Ti≦0.75, Mo 0.75-1.50 and the balance of Fe, wherein the kitchen utensil includes a cookware, dishware and culinary vessel, wherein the cookware contains a compound base, wherein the kitchen utensil is a straight body and cut edge cooker with a compound base, wherein the punch is an about 100-ton punch, wherein the diameter Φ of the wafer is about 510 mm, wherein in the first elongation the blankholder force is about 10 MPa, the angle of the male die is R16 that characterizes the male die having a corner radius R=16 mm, and the angle of the female die is R11 that characterizes the female die having a corner radius R=11 mm, and wherein in the second elongation, the blankholder force is about 5 MPa, the angle of the male die is R16 that characterizes the male die having a corner radius R=16 mm, and the angle of the female die is R5 that characterizes the female die having a corner radius R=5 mm.

5. The process according to claim 4, wherein the first elongation has an elongation coefficient of in a range of about 0.52-0.55 and the second elongation has an elongation coefficient of in a range of about 0.78-0.80.

* * * * *